NO PRINTED SPECIFICATION AVAILABLE
9015X
G. CAMERON.
RAREFIED AIR AND ROTARY MOTION STEAM ENGINE.
Patented Aug. 17, 1835.
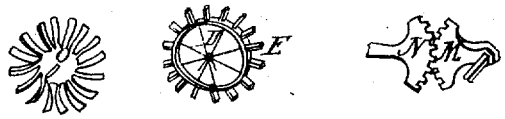
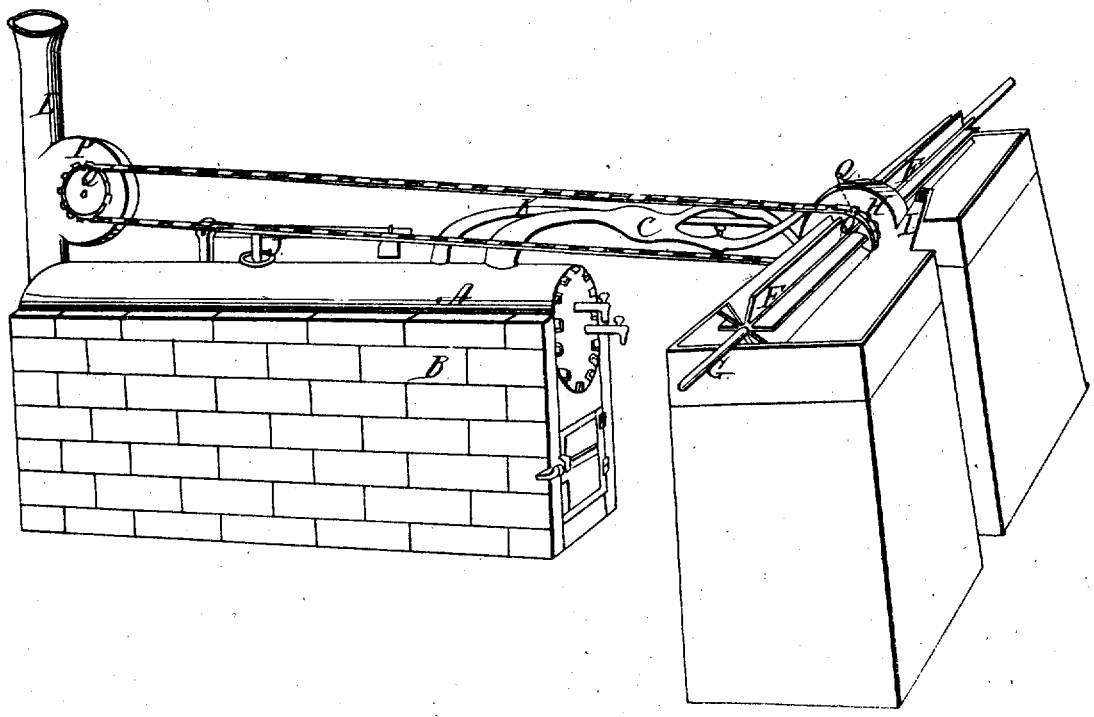

George Cameron    Aug 17, 1835

The schedule referred to in these Letters Patent and making
part of the same containing a description in the words of the
said George Cameron himself of his improvement in a
rarified air and rotary motive Steam Engine —
Be it known that I George Cameron of the City of
Washington and district of Columbia have made an
improvement in the useful arts being a rarified air and ro-
tary motion Steam Engine. This Machine consists of the follow-
ing principle parts viz. A cylindrical boiler and a furnace
of the ordinary form and construction. A forked or double Steam
Pipe attached to the boiler in the usual manner, which conduc-
ts the steam from the boiler to the steam wheel through the
steam wheel case, both of which (that is the steam wheel &
the steam wheel case) are made of sheet iron or of sheet cop-
per, sustained or supported by sundry hoops or circular bands
made of wrought iron each differing from the other in diam-
eter extending in different circles at short distances from
each other, from near the centre to near the extremity or
outer edge of both the wheel and case, the whole, both the
wheel and the case respectively, secured by means of rivets or
screws. The Steam wheel having a rim of proportionate width
and thickness in which is attached buckets of any convenient
size, shape or number, made of the same material and secured
in the same manner as above stated, both wheel and case to
be perfectly true and fitting each other so closely, that whilst
the former revolves upon its axis within the latter freely and
without touching, they are still sufficiently close together to
require no packing of any kind to prevent the steam from es-
caping down the sides of the rim to any injurious degree.
The steam is rec'd by the buckets on the steam wheel from the
steam — — — pipes, through the steam wheel case, to which
they are attached in a strong and close manner, one fork or prong of

9015X of which enters the case above the other and delivers the steam
into the buckets in opposite directions around the steam wheel,
and they must be used separately, so that by opening or turning a
cock in either fork to admit the passage of the steam upon
the wheel, and closing the cock in the other fork the steam wheel
is turned up or down, forwards or backwards, progressive or retrogr-
ade with equal force or power, The steam wheel revolves upon
an axle from which the power is communicated by cog wheel
or pulley in the usual manner, In the steam wheel case, opposite
to where the steam pipes enter it, or at some other convenient point,
there is a chimney or pipe affixed through which the superflu-
ous steam escapes and the water formed by the condensation of
the steam, drops out of the way of the steam wheel through a
small aperture in the bottom of the case into a trough or cistern
from whence it may be taken and used again, The force
pumps and safety valves required to be used in this Machine
are made and applied in the usual manner, The rarified
air or fan wheel is also made of sheet iron or copper with the
wings or fans similar to those in an ordinary wheat fan, It
is enclosed in a case likewise made of sheet iron or copper &
both being secured by means of rivets or screws and fixed in
the pipe which conducts the smoke from the furnace, the case of
the wheel being open next, the inside or flue of the pipe, and
the wheel is operated upon by the rarified air as it escapes
up the chimney or pipe from the furnace where it is generated,
and its power is communicated by a band or chain from a pulley
or cog wheel, which is attached to the end of the axle upon which
it revolves. Operation, The steam being generated in the usu-
al manner, it is conducted to the steam wheel within the steam case
through the forked or double pipe, the prongs of which being arran-
ged one above the other and pointing in opposite directions ar-
ound the wheel and both having cocks or stops in them, either is
opened as it may be necessary to turn the steam wheel one way or the other, up or down, forwards or backwards, progressive or re-
trograde. the power of action being the same both ways, and the steam
wheel being perfectly free, by its slow action, of the least incum-
brance arising from the water produced by the condensed steam,
or the surplus vapour, and in no way obstructed by friction,
none of its parts touching any other, excepting the gudgeons of the
shaft on which it rests, it has nothing to contend against but
the machinery attached to it for business purposes, The power
of the fan wheel is applied through a band reaching from a
pulley on its axle to the pulley on the axle of the steam wheel,
For further explanations, see drawings and model deposited in
the Patent Office. The invention here claimed and desired to
be secured by Letters Patent, is the combination arrange-
ment and adaptation of the several parts of the above described
machine and machinery to steam in propelling rotary mo-
tion steam engines, the use of a forked or double steam pipe
in producing a retrograde, double or contrary motion in
rotary motion steam engines, and in the construction of the
steam wheel and steam wheel case with, &c. or by the use of
the materials and for the purposes before mentioned, Witnesses
Mathew Wilson
John D. Clark George Cameron Exd. H. G[illegible]
Apl. 22[illegible]

Drawing (1032 words)